United States Patent [19]

Wittke

[11] 4,332,999
[45] Jun. 1, 1982

[54] METHOD FOR MACHINING A WORKPIECE WITH A BEAM OF RADIANT ENERGY ASSISTED BY A CHEMICALLY-REACTIVE GAS

[75] Inventor: James P. Wittke, Princeton, N.J.

[73] Assignee: RCA Corporation, New York, N.Y.

[21] Appl. No.: 195,645

[22] Filed: Oct. 9, 1980

[51] Int. Cl.³ .............................................. B23K 27/00
[52] U.S. Cl. ...................... 219/121 LJ; 219/121 FS; 219/121 LN; 219/121 LG; 219/121 LL
[58] Field of Search .................. 219/121 FS, 121 LJ, 219/121 LH, 121 LG, 121 LN, 121 LK, 121 LL, 121 L, 121 LM

[56] References Cited

U.S. PATENT DOCUMENTS

| | | | |
|---|---|---|---|
| 3,569,660 | 3/1971 | Houldcroft | 219/121 LH |
| 3,597,578 | 8/1971 | Sullivan | 219/121 LG |
| 3,601,576 | 8/1971 | Schlatli et al. | 219/121 L |
| 3,965,328 | 6/1976 | Locke | 219/121 LN |
| 4,084,988 | 4/1978 | Engel et al. | 219/121 L X |
| 4,167,662 | 9/1979 | Steen | 219/121 FS X |

OTHER PUBLICATIONS

M. V. Sullivan et al., "Direct Photoetching of Evaporated Germanium and Its Use in Mask Fabrication", *Electrochemical Technology*, 6 430–434 (1968).

I. M. Beterov et al., "Effect of the Laser Radiation Intensity on the Kinetics of the Heterogeneous Photochemical Reaction between Single-Crystal Germanium and Bromine Gas ", *Sov. J. Quantum Electron*, 8 1310–1312 (1978).

*Primary Examiner*—C. L. Albritton
*Attorney, Agent, or Firm*—E. M. Whitacre; D. H. Irlbeck; L. Greenspan

[57] ABSTRACT

A method for machining a workpiece with a beam of radiant energy in the presence of a chemically-reactive gas characterized in that (a) the beam heats the area of incidence of the workpiece to a reaction temperature that is below the melting point of the workpiece material and (b) the chemical reaction is exothermic and produces a reaction product having a boiling point that is below the reaction temperature of the workpiece material. The gas is preferably a halogen or nonmetallic halide which reacts with the workpiece material to produce a metal halide.

10 Claims, 2 Drawing Figures

METHOD FOR MACHINING A WORKPIECE WITH A BEAM OF RADIANT ENERGY ASSISTED BY A CHEMICALLY-REACTIVE GAS

BACKGROUND OF THE INVENTION

This invention relates to a novel method for machining a workpiece with a beam of radiant energy; for example, a laser beam, in the presence of and assisted by a chemically-reactive gas. The term "machining" includes drilling, cutting, scoring and any other procedure which alters the shape of the workpiece by removal of material from the workpiece due to the action of the beam.

Many complex processes interact when a workpiece is machined with a beam of radiant energy by a prior method. The beam first heats the incident area of the surface of the workpiece to melting. Then, molten workpiece material is further heated to the vaporization (or decomposition) temperature of the material. As this happens, and particularly after boiling begins, considerable amounts of gas can be evolved, and this can lead to appreciable gas pressures, which tend to eject the molten material from deeper portions of the workpiece, leading to "splats," buildup of material around the incident area, and/or the scattering of energy of the incident laser beam in the "plasma plume" of vaporized material. All these processes are generally undesirable and can lead to irregular hole shapes. Also, vaporized material tends to condense around the edge of the machined portion of the workpiece.

By raising the intensity of the incident beam, the amount of liquid material generated before vaporization begins is reduced, leading to generally "cleaner" holes or cuts, but greatly reduced machining efficiency. Sometimes the machining speed is greatly reduced due to laser-beam absorption in the very high temperature plasma plume produced, when the incident intensity approaches the $10^7$–$10^8$ W/cm$^2$ range.

Plastics and other insulators are generally easier to machine than metals because their lower thermal diffusivities result in less molten material being generated in a given time interval for a given incident intensity; their absorptions of radiant energy are generally higher, leading to intrinsically higher absorbed power densities for given laser powers; and they often have no real fluid stage, passing from an extremely viscous liquid state to the vapor state. Metals, on the other hand, melt and become quite fluid at temperatures well below their vaporization point.

One can convert laser machining processes in metals to ones much more like those in plastics by using chemical reactions between the beam-heated metal and a surrounding gas. In a sense, this has already been done, by using an air (or oxygen) jet coaxially with the laser beam to cut through metals. Here the energy produced by the oxidation reaction is used to reduce the vaporization energy requirement put on the laser beam. However, most metal oxides have high melting points and very low volatilities at the oxidation-reaction temperatures. As a result, considerable energy must be employed to remove the oxide material, or else it comes off in irregular droplets that lead to irregularly cut edges.

SUMMARY OF THE INVENTION

The novel method, as in prior methods, comprises directing a beam of radiant energy upon a workpiece whereby the workpiece is heated at the area of incidence with the beam. The method also includes providing, at least at the area of incidence of the beam with the workpiece, an ambient atmosphere that is chemically reactive with the material of the workpiece.

Unlike prior methods, the area of incidence is heated to a reaction temperature that is below the melting point of the workpiece material. The workpiece material and the essential component of the chemically-reactive atmosphere are so selected that the chemical reaction therebetween is exothermic, and the reaction occurs at temperatures above the boiling point of the reaction products and below the melting point of workpiece material.

There are only a limited number of combinations of materials which satisfy these conditions. However, where these conditions are satisfied, the workpiece can be machined at practical rates with relatively low energy inputs to produce a finished product which avoids one or more of the difficulties encountered with prior methods that are mentioned above.

DETAILED DESCRIPTION OF THE PREFERRED EMBODIMENTS

Figure 1:
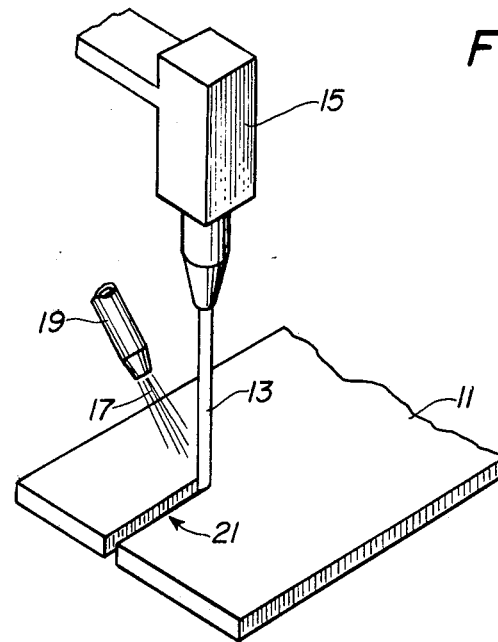
FIG. 1 is a perspective view of an apparatus in the process of practicing a first embodiment of the novel method.

FIG. 1 shows an apparatus in the process of cutting a metal sheet 11 with a laser beam 13 by a first embodiment of the novel method. The laser beam 13, which may be either pulsed or continuous wave, is generated by a laser-beam generator 15. The laser beam 13 is directed against the workpiece 11 along the prescribed path which is to be cut or otherwise machined. At the same time, a jet 17 of chemically-reactive gas from a nozzle 19 is directed against the area of incidence of the laser beam 13 with the sheet 11. The laser beam 13 heats a prescribed volume of workpiece material up to a temperature range at which the workpiece material reacts exothermically with the chemically-reactive gas. This reaction-temperature range is below the melting point of the workpiece material and above the boiling points of the products of the reaction. The movements of the laser beam 13 and the gas jet 17 are effected by moving the workpiece 11, the generator 15 and the nozzle 19 in a controlled manner with respect to one another. Also, mirrors and/or other optical devices may be used to move the laser beam 13 with respect to the workpiece 11. The chemical reaction produces reaction products that are gaseous at the reaction temperatures. These gaseous products are promptly removed from the workpiece without forming molten material, thereby producing sharply-defined machined portions that are illustrated by the cut 21.

In one embodiment, the workpiece 11 is a plate of carbon steel about 0.2-cm thick. When the beam 13 from a 100-watt carbon dioxide laser is focused to a spot about 0.05 cm in diameter on the surface of the workpiece, the surface temperature of the workpiece 11 will rise to about 650° C. in less than about one second due to energy absorbed from the beam 13, assuming that about 20% of the incident radiant energy of the beam 13 is absorbed by the workpiece 11. A jet 17 of molecular chlorine gas flowing at about 1 liter/minute at about one atmosphere is directed at the area of incidence of the laser beam 13 with the workpiece 11. An exothermic chemical reaction between the chlorine gas and the constituents of the steel workpiece accelerates, liberating more heat and raising the temperature in the area of incidence to above the boiling points of the reaction products (mainly chlorides of iron) but well below the melting temperature of about 1530° C. of the steel. The flow of chlorine gas both flushes away the gaseous reaction products and provides a fresh supply of reactive gas to the area of incidence on the workpiece 11. The combined action of the laser beam and the chemical reaction can cut a hole through the steel plate in about one second without melting the material of the workpiece.

Figure 2:
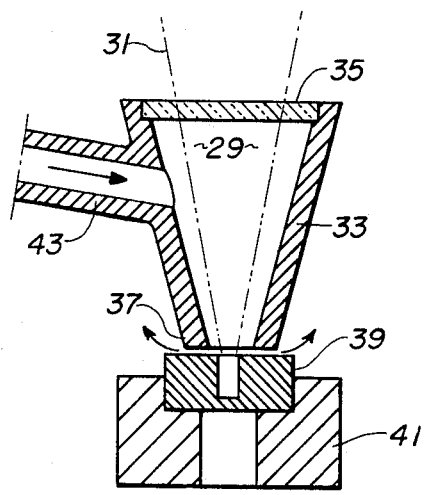
FIG. 2 is a sectional elevational view of a portion of another apparatus in the process of practicing a second embodiment of the novel method.

FIG. 2 shows an apparatus wherein a convergent laser beam 31 passes through a conical chamber 29 defined by a casing 33. The casing 33 is closed at its larger end by a window 35 that is transparent to the laser beam 31. The smaller end 37 of the casing 33 is open and is closely spaced from a workpiece 39 that is held in a chuck 41. The reactive gas is passed into the chamber 29 through a hollow side arm 43 and exhausts through the space between the workpiece 39 and the casing 33. Simultaneously, the laser beam 31 passes through the window 35 and the chamber 29 incident upon the workpiece 39. The combined action of the laser beam and the reactive gas machines the workpiece 39. By moving the workpiece 39 with respect to the casing 33, the workpiece may be cut or scored. By leaving the workpiece 39 stationary with respect to the casing 33, the workpiece may be drilled.

The preferred embodiments of the novel method are used to machine a metal workpiece. Also, the preferred embodiments use elemental or molecular chlorine ($Cl_2$) gas or a nonmetallic chloride gas, such as hydrogen chloride (HCl). In either case, a selected area of the workpiece is heated with a beam of radiant energy. The reactive gas present at the beam-heated area reacts with the heated metal to form metallic chlorides. For a class of metals (see below), a significant amount of heat is released in this reaction. Moreover, the chlorides produced by the reaction are generally very volatile, having boiling temperatures below the melting temperature of the metal of the workpiece. In such cases, a hole can be drilled without the production of any molten metal. It is preferred that the workpiece material have a melting point that is at least 100° K. higher than the boiling point of the reaction product. To prevent a reaction "run away," i.e., the laser induces ignition, after which self-sustaining "chlorine burning" occurs, the reactive gas can be diluted with an inert carrier gas to control the rate of the reaction. Alternatively, overpressures of reactive gas (above an atmosphere) may be desirable to accelerate the reaction.

An estimate of the (maximum) rate at which a hole can be drilled in this way can be obtained by assuming that an atmosphere of HCl is always in contact with the heated surface, that the reaction is $Fe + 3HCL \rightarrow FeCl_3 + (3/2)H_2$, and that each HCl molecule that strikes the surface reacts. Further, assume that the gas has a temperature of 900° K. The velocity of the reacting surface V is then given by $$V \approx \tfrac{1}{3} \times \frac{\text{atomic density of the gas}}{\text{atomic density of metal}} \times \frac{\text{velocity of gas molecules}}{\text{toward the surface}}$$

-continued $$V \approx \tfrac{1}{3} \times \frac{\left[\dfrac{6.02 \times 10^{23} \times \tfrac{1}{4}}{2.24 \times 10^4 \text{ cm}}\right]}{\left[\dfrac{7 \, gr \times 6.02 \times 10^{23}}{56 \leftarrow \text{mol. wt.}}\right]} \times$$

$$\sqrt{\frac{1.36 \times 10^{-16} \times 900}{70.9/6.024 \times 10^{23}}} \approx 1 \text{ cm/sec.}$$

Tables I and II on the following pages show metals (and other elements) that may be used with chlorine, their melting points, boiling points, and the melting and boiling points of their chlorides, plus the free energy released by the reaction. Besides chlorine, other halogens, such as bromine and iodine, and hydrogen halides, such as hydrogen chloride and hydrogen bromide, may also be used as the reactive gas. Combinations of reactive gases may be used. Also, the workpiece may be constituted of combinations of metals which satisfy the above conditions.

A beam of radiant energy is required to define a limited area of a workpiece for machining. The beam can be a focused beam of noncoherent radiant energy, or it can be a focused or collimated beam of coherent radiant energy. The function of the beam is to heat the limited area of the workpiece up to a temperature range at which a reaction between the ambient atmosphere and the workpiece proceeds at a practical rate. Thus, the beam must have sufficient energy density at the area of incidence with the workpiece to achieve this heating. It is preferred that the beam have a power density in the range of about $10^3$ to $10^5$ watts/cm$^2$. Also, the beam must be sufficiently absorbed by the workpiece and not excessively reflected. The spectral distribution of the beam should be reasonably chosen to realize sufficient energy absorption by the workpiece.

Tables I to IV below group various chemical elements according to the ease with which bodies thereof can be machined by the novel method using molecular chlorine gas as the chemically-reactive component of the ambient atmosphere. In each table, the melting point MP(E1) and boiling point BP(E1) of the element is compared with the melting point MP(MC1$_x$) and boiling point BP(MC1$_x$) of the chloride thereof produced by chemical reaction. Also, the energy $\Delta F$ in kilocalories per mol released by the reaction is given.

Table I presents chemical elements on which the novel method can be practiced with the least difficulty. With these elements, the boiling points of the chloride reaction products are lower than the melting point of the elements. In addition, the chemical reaction releases substantial energy. Workpieces of each of these elements or combinations of these elements machine well in a chlorine atmosphere using the novel method.

Table II presents chemical elements which are similar to those in Table I except that the boiling temperature of the chloride reaction product lies between the melting and boiling temperatures of the element. As a result, precision machining with the novel method may be more difficult. Workpieces of one or more of this group of elements will be significantly helped by machining in a chlorine atmosphere.

Table III presents elements which, on exposure to chlorine gas, release relatively little or no free energy. As a result, little or no chemical reaction takes place when the novel method is attempted in a halogen or halide atmosphere.

Table IV presents elements which, on exposure to chlorine gas, produce chloride reaction products whose boiling temperatures are higher than the melting temperatures of the elements. As a result, the practice of the novel method with these elements is not possible. However, the free energy available might more than compensate for the (often small) increase in boiling temperature. Also, the formation of the metal chloride may make the surface much more absorptive of the beam energy. So, even in this case, a chlorine gas environment may help in machining a body of the material.

TABLE I
ELEMENTS WHOSE CHLORIDE BOILING TEMPERATURE IS LOWER THAN THE MELTING TEMPERATURE OF THE ELEMENT, AND WHOSE REACTION WITH CHLORINE IS HIGHLY EXOTHERMIC

| Element | MP(El) | BP(El) | MP(MCl$_x$) | BP(MCl$_x$) | ΔF Kcal/mol |
|---|---|---|---|---|---|
| Al | 932° K. | 2600° K. | 466° K. | 720° K. | −150 |
| Be | 1556 | 3243 | 678 | 820 | −90 |
| B | 2300 | | 166 | 286 | −90 |
| C (diamond) | | 4620 (subl) | 249 | 350 | −15 |
| Cr | 2173 | 2915 | | 1220 (subl) | ~−100 |
| | | | 1066 | 1100 | −70 |
| Co | 1763 | 3373 | 997 | 1323 | ~−50 |
| Er | 1800 | 2900 | 1049 | 1770 | ~−180 |
| Fe | 1803 | 3008 | 577 | 592 | −70 |
| | | | 950 | 1299 | −60 |
| Hf | 2488 | 5500 | | 590 (subl) | −210 |
| Lu | 2000 | 2200 | 1178 | 1750 | ~−180 |
| Mn | 1517 | 2368 | 923 | 1463 | ~−85 |
| | | | | 900 | ~−75 |
| Nb | 2770 | 5400 | 485 | 516 | −160 |
| Ni | 1725 | 3073 | 1303 | <1336 | ~−40 |
| Sc | 1673 | 2750 | 1213 | 1240 | −170 |
| Si | 1683 | 2950 | 205 | 330 | ~−130 |
| Ta | 3269 | 5700 | 480 | 507 | −170 |
| Th | 1968 | 4500 | 1100 | 1890 | −210 |
| | | | 1038 | 1195 | −230 |
| Ti | 1998 | 3550 | | | ~−90 |
| | | | | 1200 (dissoc) | ~−130 |
| | | | 750 | 409 | ~−150 |
| Tm | 1900 | 7400 | 1094 | 1760 | −190 |
| U | 1405 | 3800 | 1108 | 2000 | −170 |
| | | | 863 | 1060 | −220 |
| | | | 603 | 800 | ~−220 |
| | | | 452 | 550 | |
| V | 2190° K. | 3650° K. | 1300° K. | 1650° K. | ~−90 |
| | | | 1000 | (dissoc) | ~−110 |
| | | | 247 | 437 | −120 |
| W | 3650 | 5950 | 600 | 605 | ~−25 |
| V | | | 517 | 549 | ~−40 |
| | | | 548 | 610 | −70 |
| Zr | 2125 | | 1006 | 1750 | −130 |
| | | | 900 | 1000 (dissoc) | −180 |
| | | | | 604 (subl) | −190 |
| As | | 886 (subl) | 257 | 403 | −7 |
| Ge | 1232 | 2970 | | 356 | |
| Sb | 903 | 1653 | 346 | 496 | |
| | | | 276 | 413 | |

TABLE II
ELEMENTS WHOSE CHLORIDE BOILING TEMPERATURE LIES BETWEEN THE MELTING AND BOILING TEMPERATURE OF THE ELEMENT

| Element | MP(El) | BP(El) | MP(MCl$_x$) | BP(MCl$_x$) | ΔF Kcal/mol |
|---|---|---|---|---|---|
| Bi | 545° K. | 1832° K. | 502° K. | 714° K. | −60 |
| Cu | 1357 | 2855 | 703 | 1963 | −25 |
| | | | | 810 (dissoc) | −35 |
| Dy | 1673 | 2600 | 920 | 1800 | ~−160 |
| Eu | 1173 | 1700 | 896 | (dissoc) | ~−170 |
| Gd | 1523 | 3000 | 882 | 1850 | ~−190 |
| Ho | 1773 | 2600 | 991 | 1780 | ~−180 |
| La | 1193 | 4515 | 1135 | 2020 | ~−210 |
| Hg | 234 | 630 | 550 | 557 | ~−30 |
| Nd | 1297 | 3450 | 1031 | 1940 | ~−200 |
| P | 317 | 553 | 182 | 348 | ~−70 |
| | | | | 439 (subl) | ~−70 |
| Pb | 600 | 2024 | 771 | 1227 | ~−60 |
| Pr | 1208 | 3290 | 1059 | 1980 | ~−200 |
| Pm | 1573 | 3000 | 1010 | 1940 | ~−170 |
| Tb | 1638 | 2800 | 855 | 1820 | ~−180 |
| Sn | 505 | 2960 | 500 | 925 | −70 |
| | | | 240 | 386 | ~−15 |
| Y | 1773 | 3500 | 982 | 1780 | ~−200 |
| Zn | 693 | 1181 | 556 | 1005 | −75 |
| Ga | 303 | 2256 | 351 | 474 | |
| In | 429 | 1723 | 508 | 833 | |
| | | | 859 | 873 | |

TABLE III
ELEMENTS WHOSE CHLORIDES ARE APT TO BE UNSTABLE

| Element | MP(El) | BP(El) | MP(MCl$_x$) | BP(MCl$_x$) | ΔF Kcal/mol |
|---|---|---|---|---|---|
| Au | 1336° K. | 2980° K. | 561° K. | 700° K. | ~−5 |
| Ce | 813 | 1673 | 1095 | 2000 | −2200 |
| Ag | 1234 | 2450 | 728 | 1837 (dissoc) | ~−20 |
| Mo | 2883 | | | 1300 (subl) | ~−20 |
| | | | 1000 | 1700 | ~−25 |
| Pt | 2042 | 4100 | | 856 (dissoc) | ~−15 |
| | | | | 854 (dissoc) | ~−15 |
| | | | | 708 (dissoc) | ~−15 |
| | | | >600 | (dissoc) | ~−15 |
| Re | 3453 | 5900 | 1000 | 1100 | −30 |
| | | | 530 | 600 | −30 |
| Sm | 1325 | 1860 | 955 | (dissoc) | −170 |
| | | | 835 | 2300 | −180 |
| Ru | >1950 | | | 500 (dissoc) | |
| Rh | 1985 | >2500 | | 500 (dissoc) | |
| Pd | 1549 | 2540 | | 500 (dissoc) | |
| Os | 2700 | >5300 | | 580 (dissoc) | |
| Ir | 2454 | >4800 | | 770 (dissoc) | |
| Tl | 575 | 1730 | 673 | (dissoc) | |
| | | | 298 | (dissoc) | |

TABLE IV
ELEMENTS WHOSE CHLORIDES ARE NONVOLATILE (COMPARED TO THE ELEMENTS THEMSELVES)

| Element | MP(El) | BP(El) | MP(MCl$_x$) | BP(Mclx) | ΔF Kcal/mol |
|---|---|---|---|---|---|
| Ba | 983° K. | 1911° K. | 1233° K. | 2100° K. | ~−190 |
| Cd | 594 | 1038 | 841 | 1240 | −70 |
| Ca | 1124 | 1760 | 1055 | 2300 | −170 |
| Li | 454 | 1604 | 887 | 1653 | ~−80 |

TABLE IV-continued

ELEMENTS WHOSE CHLORIDES ARE NONVOLATILE
(COMPARED TO THE ELEMENTS THEMSELVES)

| Element | MP(El) | BP(El) | MP(MCl$_x$) | BP(Mcl$_x$) | ΔF Kcal/mol |
|---|---|---|---|---|---|
| Mg | 923 | 1393 | 987 | 1691 | ~ −120 |
| K | 337 | 1030 | 1043 | 1680 | ~ −80 |
| Na | 371 | 1162 | 1073 | 1738 | −80 |
| Sr | 1043 | 1657 | 1145 | 2300 | ~ −160 |
| Yb | 1097 | 1800 | 975 | 2200 | −150 |
|  |  |  | 1138 | 1500 (dissoc) | −150 |
| Rb | 312 | 973 | 988 | 1663 |  |
| Cs | 301 | 943 | 919 | 1563 (subl) |  |

I claim:

1. A method for machining a workpiece including (i) directing a beam of radiant energy upon said workpiece whereby said workpiece absorbs substantial energy of said beam and is thereby heated at the area of incidence with said beam and (ii) providing at least at said area of incidence with said beam, an ambient atmosphere that is chemically reactive with the material of said workpiece whereby a chemical reaction occurs between said atmosphere and workpiece material, characterized in that
(a) said beam is of such power density as to heat said area of incidence to a reaction temperature that is below the melting point of said workpiece material but high enough for said chemical reaction to proceed at a practical rate,
(b) said chemical reaction is exothermic and produces a reaction product having a boiling point that is below said reaction temperature and gaseous when formed,
(c) and said radiant energy is of such wavelengths as to produce substantially no reactive dissociation products in said atmosphere.

2. The method defined in claim 1 wherein said atmosphere contains as its essential component a substance that is gaseous at about room temperature and about one atmosphere of pressure and is selected from the group consisting of halogens and nonmetallic halides.

3. A method defined in claim 2 wherein said atmosphere contains as its essential component hydrogen chloride.

4. The method defined in claim 2 wherein said atmosphere contains as its essential component elemental chlorine.

5. The method defined in claim 2 wherein said workpiece consists essentially of at least one metal which forms a metal halide by exothermic chemical reaction with said essential component of said atmosphere, which metal halide has a boiling point below the melting point of said workpiece.

6. The method defined in claim 5 wherein workpiece consists essentially of an alloy of metals, each of which forms a metal halide by exothermic chemical reaction with said essential component of said atmosphere.

7. A method defined in claim 1 wherein the melting point of said workpiece material is at least 100° K. higher than the boiling point of said reaction product.

8. The method defined in claim 1 wherein said beam has a power density in the range of about $10^3$ to $10^5$ watts/cm$^2$.

9. The method defined in claim 1 wherein said ambient atmosphere is introduced as a jet of flowing gas directed at said area of incidence.

10. The method defined in claim 1 wherein said ambient atmosphere comprises a chemically-reactive gas and a nonreactive gas so proportioned with respect to other process parameters as to give accurate control over the rate of said chemical reaction.

* * * * *